United States Patent [19]

Henry et al.

[11] 4,319,846
[45] Mar. 16, 1982

[54] METHOD AND APPARATUS FOR ALIGNING AN OPHTHALMIC LENS DURING A BLOCKING OPERATION

[75] Inventors: David W. Henry; Herbert H. Mathews, both of Muskogee, Okla.

[73] Assignee: Coburn Optical Industries, Inc., Muskogee, Okla.

[21] Appl. No.: 106,830

[22] Filed: Dec. 26, 1979

[51] Int. Cl.$^3$ ............................................. B01B 11/26
[52] U.S. Cl. ..................................... 356/401; 356/127
[58] Field of Search ................................. 356/399–401, 356/153, 127, 396–397; 33/174 A, 1 D, 488; 51/216 LP, 277; 350/110

[56] References Cited

U.S. PATENT DOCUMENTS

| | | |
|---|---|---|
| 2,166,037 | 7/1939 | Campos . |
| 2,465,153 | 3/1949 | Fritzsche . |
| 3,257,686 | 6/1966 | Merker et al. . |
| 3,804,153 | 4/1974 | Tagnon . |
| 4,136,727 | 1/1979 | Vogt . |
| 4,169,318 | 10/1979 | Cortés .............................. 33/174 A |

FOREIGN PATENT DOCUMENTS 342757  2/1931  United Kingdom ................ 350/110

*Primary Examiner*—William H. Punter
*Attorney, Agent, or Firm*—John J. Byrne

[57] ABSTRACT

A method and apparatus for aligning a lens blank upon a lens blocking device. The apparatus comprises a transparent aligning member, attached by arm means to a stanchion on the lens blocking machine. Vertically aligned perpendicular intersecting linear indicia are imprinted upon the upper and lower surfaces of the transparent member for vertically aligning an underlying lens without introducing a parallax error. A lens retaining member is also carried by the stanchion and is selectively pivoted into position to retain the aligned lens blank for blocking. The method consists of rotating a lens blank upon a lens blocking machine until perpendicularly intersecting linear indicia on the surface of the lens are vertically aligned with perpendicularly intersecting indicia on the upper and lower surfaces of a transparent aligning member. Once alignment is achieved the transparent aligning member is rotated away and a retaining member is rotated into position and biases the lens blank against the lens blocking apparatus.

1 Claim, 5 Drawing Figures

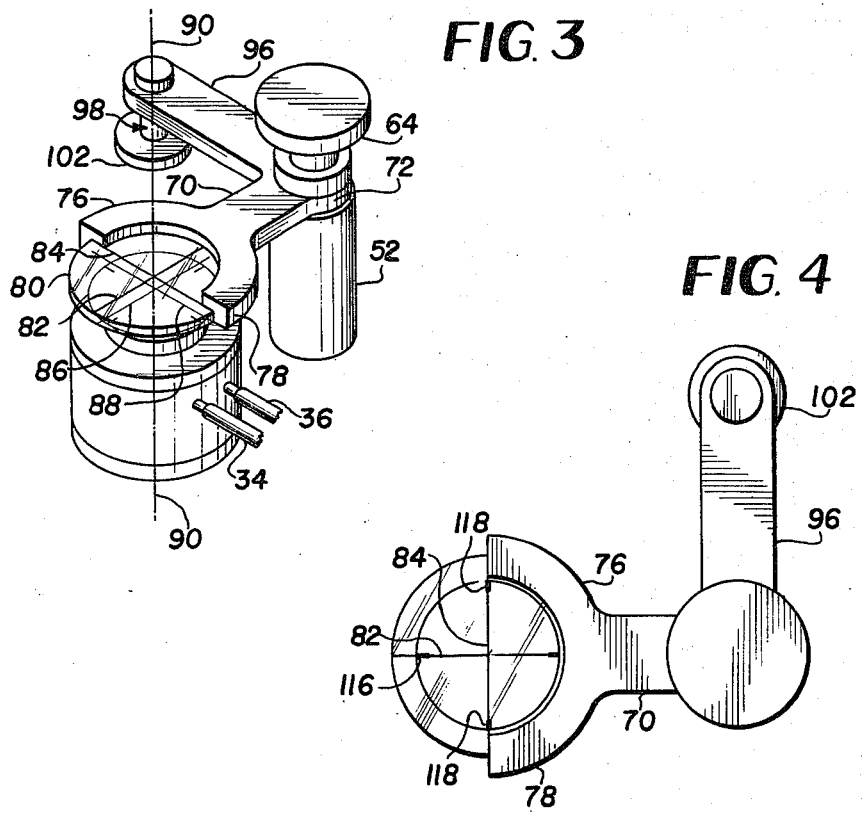
FIG. 3
FIG. 4
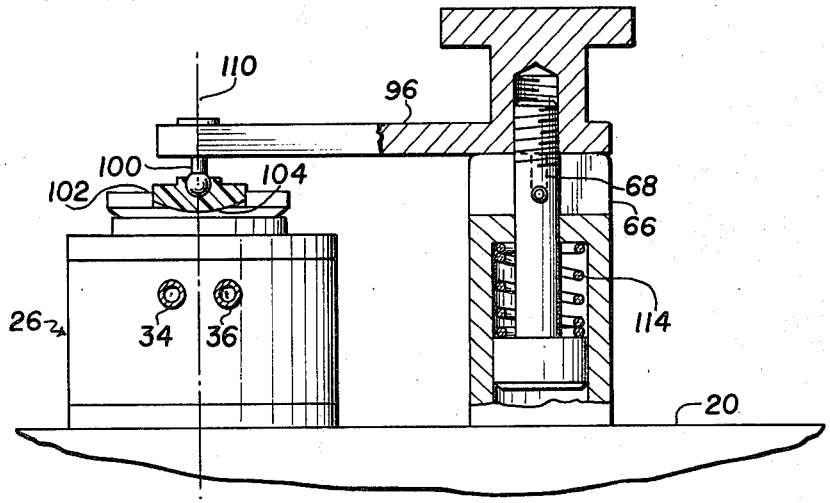
FIG. 5

METHOD AND APPARATUS FOR ALIGNING AN OPHTHALMIC LENS DURING A BLOCKING OPERATION

BACKGROUND OF THE INVENTION

This invention relates to a method and apparatus for aligning and retaining ophthalmic lenses during a blocking operation.

In ophthalmic optics, toric lens blanks are formed from glass or plastic compositions. A convex surface of the lens blank is then mounted upon a retaining member known as a lens block which is preferably composed of a low melting temperature alloy. In general terms finishing of the lens blank is achieved by mounting the lens and block accurately upon a tool holding assembly whereupon prescriptive surfaces are ground into the lens blank with one prescriptive value for the horizontal meridian or base cut and a different prescriptive value for the vertical meridian or cylinder cut. Following the initial step of grinding, the lens is mounted upon further process machinery which serves to lap and polish a final prescription onto the lens blank. Finally, the lens blank is mounted upon an edge grinding apparatus and an edge configuration is ground upon the lens to achieve proper fit of the lens into conventional eyeglass frames.

In each of the foregoing process steps, it is critical to maintain a desired orientation and reference of the lens being ground. This is achieved by accurately mounting the lens upon the lens block.

In the past, lens blanks to be mounted or blocked have been fitted upon frame assemblies and molten alloy has been injected into a cavity surrounding a central convex portion of the lens blank. Upon cooling of the molten metal, the lens is removed from the blocking apparatus for further processing as discussed above. Examples of prior lens blocking methods and apparatus may be had by reference to U.S. Suddarth Pat. No. 3,468,366; Saroffen Pat. No. 3,704,558 and Coburn et al. U.S. Pat. No. 3,794,314, of common assignment with the subject application. These patents disclosed various advantageous methods and apparatus for blocking an ophthalmic lens.

Notwithstanding the advantages provided by prior art lens blocking techniques, room for improvement remains. In this connection, it would be highly desirable to provide a method and apparatus for aligning a lens blank prior to a lens blocking operation wherein orientation of the base and cylinder axes may be quickly and accurately achieved with a minimum of parallax error. Still further, it would be desirable to provide a lens retaining apparatus which may be quickly positioned upon an aligned lens with uniform pressure which will not deflect or bend lens blanks, such as those composed of plastic compositions.

OBJECTS OF THE INVENTION

It is therefore a general object of the invention to provide a novel method and apparatus for aligning and retaining lens blanks which will advantageously exhibit desired properties of the type previously described.

It is a specific object of the invention to provide a novel method and apparatus for aligning a lens blank wherein parallax error will be minimized.

It is a further object of the invention to provide a novel method and apparatus for aligning ophthalmic lenses which will reduce the complexity and time required to achieve accurate lens alignment.

It is yet a further object of the invention to provide a novel method and apparatus for aligning ophthalmic lenses wherein alignment of lens blanks may be facilely achieved by relatively unskilled personnel.

It is another object of the invention to provide a novel method and apparatus for aligning ophthalmic lenses wherein uniform application of lens retaining pressure will be achieved.

BRIEF SUMMARY OF THE INVENTION

A preferred embodiment of the invention which is intended to accomplish at least some of the foregoing objects comprises a method and apparatus for aligning a lens blank upon a lens blocking device wherein the apparatus comprises a transparent aligning member, attached by arm means to a stanchion on a lens blocking machine. The aligning member has vertically aligned perpendicular indicia on its upper and lower surfaces for vertically aligning a lens blank without introducing parallax error. Once aligned the lens blank is retained in position by a retaining member which biases the lens against the lens blocking apparatus. The method consists of rotating the lens blank upon a lens blocking machine until perpendicularly intersecting indicia on the surface of the lens are vertically aligned with perpendicularly intersecting indicia on the upper and lower surfaces of a transparent aligning member. Following alignment the alignment member is rotated away and a spring biased retaining member is positioned upon the lens blank to hold the blank in position during the blocking operation.

THE DRAWINGS

Other objects and advantages of the present invention will become apparent from the following detailed description of a preferred embodiment thereof taken in conjunction with the accompanying drawings, wherein:

FIG. 3 is an axonometric detail view of the lens alignment mechanism disclosed in FIG. 2 wherein upper and lower alignment lines are shown upon a transparent alignment disc;

FIG. 4 is a plan view of the lens alignment mechanism disclosed in FIG. 3 wherein the upper and lower alignment lines as well as base and cylinder axis indicia on an underlying lens are in vertical alignment; and FIG. 5 is a cross-sectional view of a spring biased lens retaining mechanism in accordance with a preferred embodiment of the invention.

DETAILED DESCRIPTION

Figure 1:
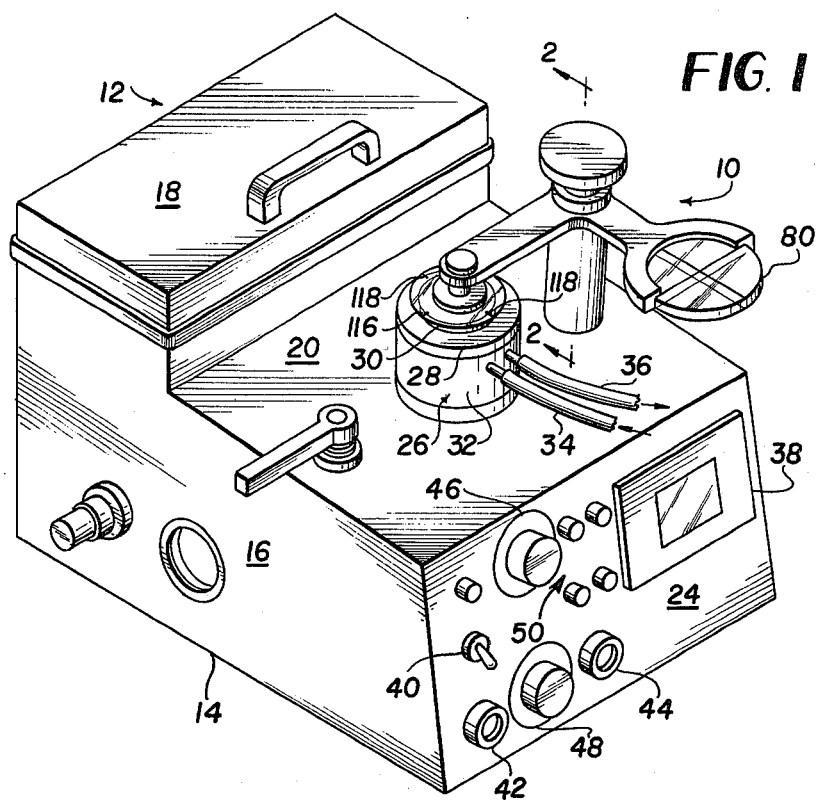
FIG. 1 is an axonometric view of a lens blocking apparatus in accordance with a preferred embodiment of the invention.
Figure 2:
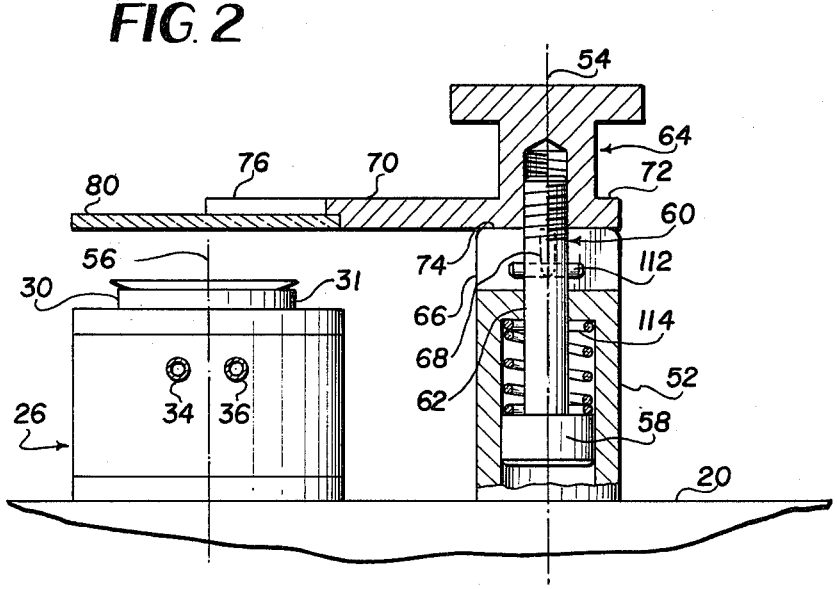
FIG. 2 is a cross-sectional view of the lens alignment mechanism positioned above an ophthalmic lens.

Referring to the drawings, wherein like numerals indicate like parts, and particularly FIG. 1 thereof, there will be seen an axonometric representation of a lens alignment and retaining assembly 10 in accordance with a preferred embodiment of the invention.

Before providing a detailed description of the subject aligning and retaining assembly it may be worth-while to briefly outline the context of the instant invention. In this connection, FIG. 1 discloses a lens blocking apparatus 12 including an exterior housing 14 with substantially vertical sidewalls 16 and a horizontal lid 18 upon an upper rear portion thereof. An upper forward portion 20 of the blocking apparatus extends from the lid 18 to a front wall or face 24.

The blocking apparatus is provided with an interior bowl shaped heating reservoir (not shown) for holding metallic injection ring 26. The injection ring 26 has an upper seat member 28 operable to receive a convex surface of a lens blank 30 to be blocked. The metallic ring 26 is cooled by a peripheral chamber 32 which is selectively supplied with a cooling fluid via supply and return lines 34 and 36 respectively.

The front face 24 of the lens blocking apparatus may be provided with a digital temperature readout 38 which may operably indicate temperature of the blocking alloy within the reservoir and in an alloy stem leading to the metallic blocking ring 26. Additionally, the face of the blocker may be provided with an on-off toggle switch 40, fuses 42 and 44, temperature setting dials 46 and 48 for reservoir and delivery stem temperatures respectively, as well as on-off indicator lights 50, as desired. For a more detailed description of a lens blocking apparatus, reference may be had to the previously identified Suddarth U.S. Pat. No. 3,468,366.

Alignment and Retaining Apparatus

Referring now to FIGS. 2–5 there will be seen alternative views of a lens alignment and retaining apparatus 10 in accordance with a preferred embodiment of the invention. More specifically, the apparatus comprises a stanchion 52 mounted upon the surface 20 of the lens blocking apparatus. A central longitudinal axis 54 of the stanchion is positioned in a posture adjacent to and mutually parallel with a central longitudinal axis 56 extending through the lens blocking collar 26.

A central portion of the stanchion 52 is hollow and serves to receive in reciprocation a head portion 58 of a connecting shaft 60. A shank portion 62 of the connecting shaft extends upwardly from the head 58 and threadedly engages into an alignment and retaining member 64.

The aligning and retaining member 64 includes a first arm 70 extending radially outward from a central hub or pivotal mounting means 72 which rests on an upper surface 74 of the stanchion. The endmost portion of the arm 70 is arcuately bifurcated, note FIG. 3, into a first 76 and a second 78 holding arm which serve to at least partially encompass and support a transparent alignment disc 80.

The alignment disc comprises a generally flat cylindrical member of glass or transparent plastic having a first set of mutually perpendicular, first and second, alignment lines 82 and 84 scribed across the upper surface thereof. Below said first and second alignment lines 82 and 84 and below the transparent disc 80 is a second set of mutually perpendicular, third and fourth, alignment lines 86 and 88. The upper and lower lines 82 and 86 lie in a plane extending perpendicular to the surface of the disc 80 while lines 84 and 88 extend within a second plane which is also perpendicular to the plane of disc 80. Accordingly, the first and third alignment lines 82 and 86 and the second and fourth alignment lines, 84 and 88, are in direct vertical alignment as viewed along a central longitudinal axis 90 extending through the alignment disc 80.

A second arm 96 extends radially from the hub 72 and terminates at a length approximately equal to the distance of the central longitudinal axis 90 from axis 54. A retaining member 98 is fixedly mounted at the end of the arm 96 and terminates with a universal ball connection 100 which is mated with an upper portion of a retaining disc 102. A lowermost portion of the retaining disc 102 is fashioned with a partial spherical configuration which is compatible with that of a convex portion of a lens blank to be blocked. A central longitudinal axis 110 passing through the retaining member 102 extends radially a distance from axis 54 an amount exactly equal to the radial distance between parallel axes 54 and 56.

An upper portion of the stanchion 52 provides a generally flat bearing surface 74 and is fashioned with position determining voids or channels 66 and 68 which define a crossing channelway at the upper portion of the stanchion.

A position determining rod 112 extends transversely through the shank 62 and in alignment with arm 70 such that an extension of a central longitudinal axis thereof will intersect axis 90.

A compression spring 114 extends between stanchion 52 and the head 58 of the connecting shaft. Accordingly, lifting of the alignment and retaining assembly 64 against the bias of retaining spring 114 will carry the position determining pin above channels 66 and 68. Rotation of the alignment and retaining assembly 64 may be achieved in this posture. Upon rotation the position determining rod is permitted to descend within channel 66 or 68 to bring the lens alignment disc or lens retaining member into axial alignment with the lens.

Sequence of Operation

In operation, a lens blank 30 having previously received horizontal and vertical cut indicia 116 and 118, which may be ink dots or dashes applied directly to the convex surface of the lens blank, is held upon the lens blocking collar 26. In order to accurately and facilely align the lens blank, an operator then lifts upwardly against the bias of spring 114 until rod 112 is in alignment with channel 66. Member 64 is then lowered into position and the operator looks axially along the central longitudinal axis 90 of the aligning member. The lens blank 30 is then manually rotated and/or canted until the alignment lines 82 and 84 on the upper alignment surface and 86 and 88 on the lower alignment surface lie directly above the indicia 116 and 118 on the lens blank. The parallel nature of the alignment lines insures direct angular perception thus eliminating a parallax effect during the alignment operation.

Upon alignment of the lens, the operator maintains its position with one hand while the alignment and retainment mechanism is lifted with the other, and rotated until rod 112 is in vertical alignment with channel 68. The member 64 is then lowered and the arcuate bearing portion of pad 102 is intimately received within the concave surface of lens 30, note FIG. 5.

In this retained posture, downward force upon the lens blank 64 is uniformly applied by the compression spring 114 which minimizes any possibility of applying too much retaining pressure to the lens blank and distorting the toric configuration thereof during the blocking operation.

ADVANTAGES OF THE INVENTION

After reading and understanding the foregoing description of the invention, in conjunction with the drawings, it will be appreciated that several distinct advantages of the subject lens alignment and retaining apparatus are obtained.

Without attempting to set forth all the desirable features of the instant method and apparatus, at least some of the major advantages of the invention include the unique provision of upper and lower mutually parallel alignment lines upon a lens alignment disc. These line pairs enable an operator to achieve a direct angular perception and thus eliminate a parallax effect during an alignment operation. Moreover, the novel alignment disc and dual alignment line arrangement allows a relatively unskilled operator to facilely align an ophthalmic lens in a reduced amount of time as compared with previously known techniques.

Further, the spring biased retaining assembly accurately provides a predetermined amount of force distributed across the concave surface of the lens blank, this uniform spring force minimizing distortion of plastic lenses during a blocking operation.

In describing the invention, reference has been made to a preferred embodiment. Those skilled in the art, however, and familiar with the disclosure of the subject invention, may recognize additions, deletions, modifications, substitutions and/or other changes which will fall within the purview of the subject invention.

What is claimed is:

1. An alignment apparatus operable for use in aligning ophthalmic lens to be blocked comprising:

a support stanchion operable to be mounted upon a lens blocking apparatus;

first arm means connected to said support stanchion and radially extending outwardly therefrom;

lens alignment means carried by a radially outward end of said first arm means, said lens alignment means including, a transparent member having upper and lower mutually parallel planar surfaces, a first indicia operably defining a line extending across said upper surface of said transparent member, a second indicia operably defining a line extending across said upper surface of said transparent member and lying perpendicular to said first indicia, a third indicia operably defining a line extending across said lower surface of said transparent member and lying in a plane perpendicular to said upper and lower planar surfaces of said transparent member and intersecting said first indicia, and a fourth indicia operably defining a line extending across said lower surface of said transparent member and lying in a plane perpendicular to said upper and lower planar surfaces of said transparent member and intersecting said second indicia, wherein an opthalmic lens having horizontal and vertical indicia imprinted thereon may be optically aligned beneath said alignment means with a minimum of parallax error by vertically aligning said first and third indicia with one of the horizontal and vertical lens indicia and vertically aligning said second and fourth indicia with the other of the horizontal and vertical lens indicia;

second arm means connected to said support stanchion and radially extending outwardly therefrom;

lens retaining means carried by a radially outward end of said second arm means for operably retaining a lens to be blocked by the lens blocking apparatus;

spring means operably connected to said second arm means for biasing said lens retaining means in securing contact with the lens to be blocked by the lens blocking apparatus;

pivotal mounted means interconnecting said first arm means, said second arm means and said stanchion for selectively pivoting one of said lens alignment means and said lens retaining means in a first position in operative alignment with a lens to be blocked and for selectively pivoting the other of said lens alignment means and said lens retaining means in a second position in operative alignment with the lens to be blocked; and means for selectively securing said pivotal mounted means in said first and second operative position with respect to the lens to be blocked.

* * * * *